M. F. REDMON.
DISH WASHING MACHINE.
APPLICATION FILED SEPT. 14, 1914.

1,153,255.

Patented Sept. 14, 1915.
2 SHEETS—SHEET 1.

Witnesses
J. Stanley Burch
D. W. Bryant

Inventor
Marion F. Redmon

By A. M. Wilson
Attorney

M. F. REDMON.
DISH WASHING MACHINE.
APPLICATION FILED SEPT. 14, 1914.

1,153,255.

Patented Sept. 14, 1915.
2 SHEETS—SHEET 2.

Witnesses
J. Stanley Burch
D. K. Bryant

Inventor
Marion F. Redmon
A. M. Wilson
Attorney

By

UNITED STATES PATENT OFFICE.

MARION F. REDMON, OF CEDAR RAPIDS, IOWA.

DISH-WASHING MACHINE.

1,153,255.  Specification of Letters Patent.  Patented Sept. 14, 1915.

Application filed September 14, 1914. Serial No. 861,609.

*To all whom it may concern:*

Be it known that I, MARION F. REDMON, a citizen of the United States, residing at Cedar Rapids, in the county of Linn and State of Iowa, have invented certain new and useful Improvements in Dish-Washing Machines, of which the following is a specification.

This invention relates to certain new and useful improvements in dish washing machines.

The primary object of the invention is to provide a device whereby a large quantity of dishes or similar articles may be successively washed, rinsed and dried in a rapid and advantageous manner without a manual handling of the articles to be washed.

A further object of the device is to provide a separate washing and rinsing device, the former being provided with a mechanical dish agitator and the latter having a skimming attachment.

It is also designed to provide a heater in connection with a mechanical washer and rinser for dishes, as well as a conveyer for the articles.

A still further important feature is to provide a means for engaging the dish basket with the rotating platform therefor in such a manner that the same is automatically disengaged therefrom by a stopping of the platform while the entire device may be either manually or motor driven.

With these general objects in view and others that will appear as the nature of the invention is better understood, the same consists in the novel combination and arrangement of parts to be hereinafter more fully described, illustrated in the accompanying drawings, and set forth in the appended claims.

Figure 1:
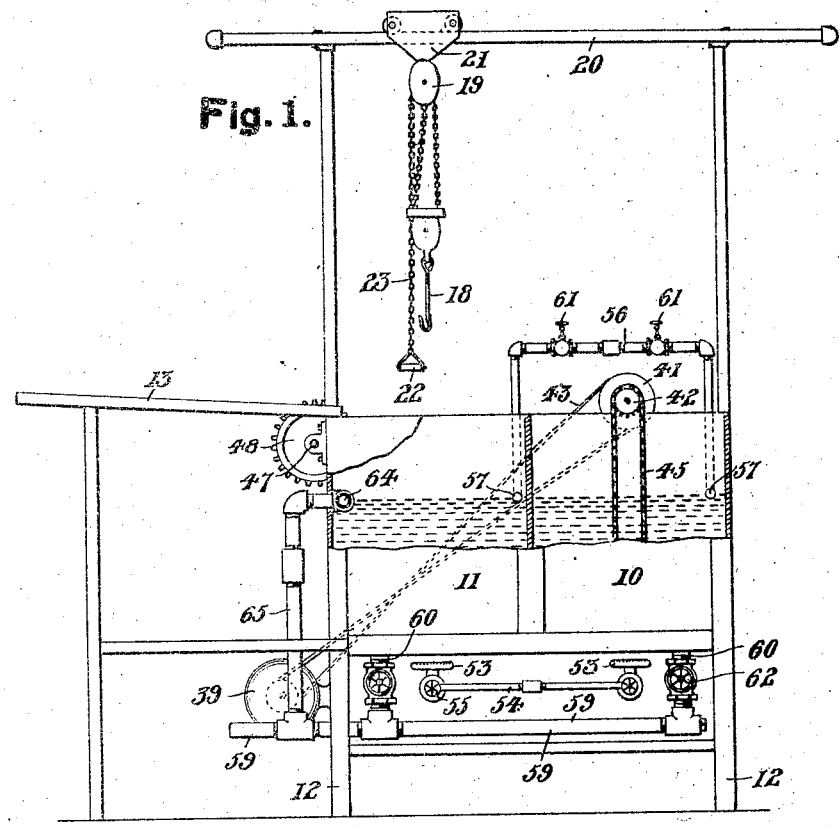
Figure 2:
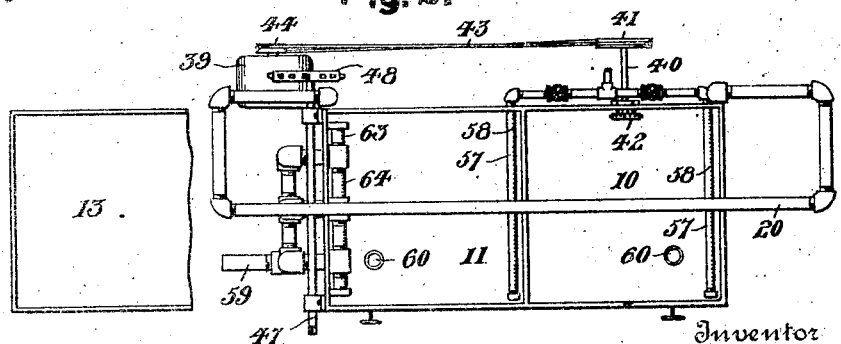
Figure 3:
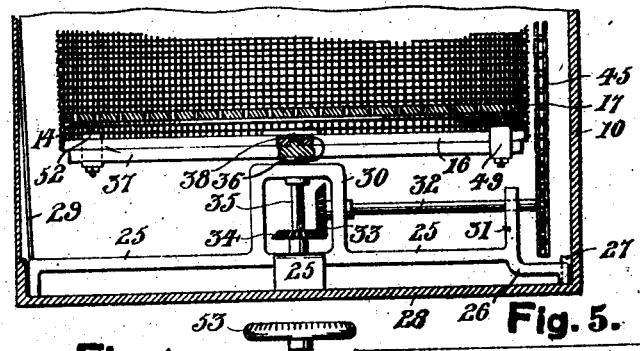
Figure 4:
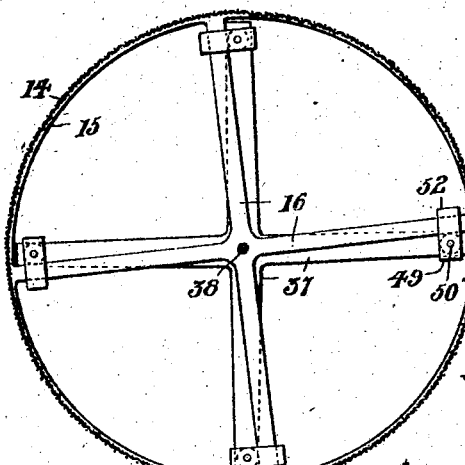
Figure 5:
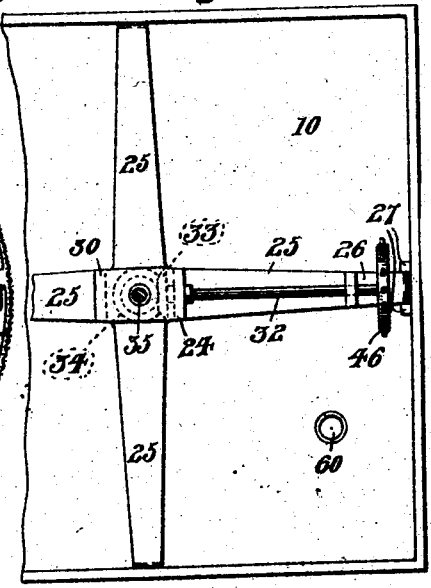
Figure 6:
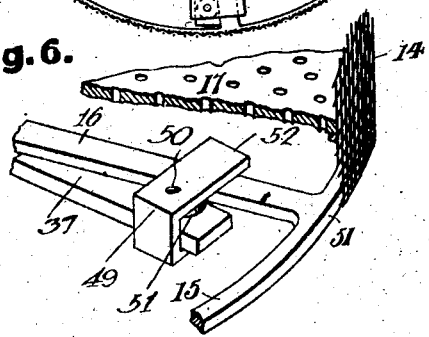
Figure 7:
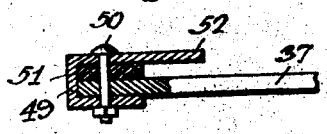

In the drawings forming a part of this application and in which like designating characters refer to corresponding parts throughout the several views, Figure 1 is a side elevation of the device with the front portion of the casing partially removed. Fig. 2 is a top plan view thereof with the draining board broken away. Fig. 3 is a vertical longitudinal sectional view of the lower portion of the washing tank and the dish basket and showing one of the burners positioned therebeneath. Fig. 4 is a horizontal sectional view through the dish basket, the same being mounted upon its platform, but having its wooden bottom removed. Fig. 5 is a top plan view of the washing tank partially broken away and with the basket, platform and sprocket chain removed. Fig. 6 is an enlarged detail view partly in section and partly in perspective showing the attaching means for the basket and its platform, and Fig. 7 is a detail view of the basket engaging clip illustrated in section and is mounted upon an end portion of one of the platform arms.

Referring more in detail to the drawings, the machine is broadly designed to provide a washing tank 10 and a rinsing tank 11 mounted upon suitable leg supports 12 while a draining board 13 is positioned adjacent the top edge of the rinsing tank. The dishes or articles to be washed are placed in the basket 14 which is provided with foraminous side walls and a spider shaped bottom 15 having radial arms 16, the basket being of a cylindrical form. A false bottom 17 preferably formed of a circular piece of wood having perforations therethrough is positioned within the basket and above the bottom 16 thereof.

The basket is preferably provided with an ordinary bail (not shown) and the basket being placed upon the draining board and filled with the dishes, the bail thereof is engaged by the hook 18 of the block and tackle device 19 and is transferred to the washing tank by moving the block and tackle upon the track 20, the same having a carriage 21 slidable thereon, while a handle 22 secured to the end of the chain 23 of the elevating device is designed for the manipulation thereof.

A frame 24 having radial arms 25 is positioned within the washing tank 10, one of the said arms having a projecting end 26 engaging lugs 27 upon the bottom 28 of the said tank, while a side carried spring 29 engages the opposite arm of the frame and removably retains the frame seated upon the tank bottom. A central bracket 30 is positioned upon the frame 24 while one of the arms of the frame is provided with a bearing 31, and a shaft 32 is journaled within the said bearing and bracket, and in parallelism with the adjacent frame arm. A pinion 33 is provided upon the inner end of the shaft 32, the same being in constant mesh with a pinion 34 carried by the vertical stub shaft 35 which is also journaled within the bracket 30 and has a projecting upper end having integrally mounted thereon a spider platform 37, while above the upper end of the shaft 35 the platform is centrally provided with an upwardly-extending cone 38 and adapted to mount the spider bottom 15 of the basket thereon, by means of the tapered central opening 36 of said bottom, as best illustrated in Fig. 3, and to thereby center the said bottom.

A motor 39 is preferably provided for revolving the platform 37 with its basket mounted thereon. A stub shaft 40 is journaled adjacent the top of the washing tank and is provided with a pulley 41 upon its outer end and a sprocket wheel 42 upon its inner end. A belt 43 passes over the said pulley 41 and the motor pulley 44, while a sprocket chain 45 passes over the wheel 42 and over a corresponding sprocket wheel 46 secured to the outer end of the said shaft 42. It will thus be seen that a turning of the motor will revolve the spider platform 37, while if desired, a manual operating means may be provided in the form of a crank shaft 47 having a sprocket wheel 48 adapted to be operatively connected to the said shaft 40 in any desired manner and which is not believed necessary to illustrate or describe herein.

The arms of the spider platform 37 are each provided adjacent their outer ends with spring clips 49 U-shaped in cross section and secured to the said ends by means of bolts 50 and positioning interposed bushings 51 within the clips in such a manner as to position the extending finger 52 of each of said clips slightly spaced above the upper face of the carrying spider arm and projecting substantially perpendicular thereto, the said fingers all projecting in the same direction tangentially from all of the said arms. With the basket mounted upon the platform 37 and centrally journaled upon the shaft portion 38 by means of the basket bottom 15, the clips are placed with their fingers 52 above the arms 16 of the basket bottom and the revolving of the spider platform in its normal anti-clockwise direction tends to more firmly engage the said clip fingers with the spider for retaining the basket upon the platform. Upon suddenly stopping the revolving movement of the platform, the basket will be disengaged from the clip fingers as it will by reason of its own weight continue to revolve for a short distance which disengaging revolving of the spider 16 may continue until the spider arms engage the flat rear ends of the clips 49. There is thus provided a serviceable engaging means between the platform and basket which is automatically released upon a stopping of the motor and at which times it will be desirable to remove the basket from the tank. The cylindrical form of the basket within the rectangular form of tank prevents the water contained therein from being bodily rotated with the basket, and retains the same in contact with the dishes, which are rotarily moved within the tank.

A gas burner 53 is positioned beneath each of the tanks 10 and 11 for heating the water contained therein, the said burners being supplied with fuel through the pipes 54 and regulated by the turn valves 55.

Hot water pipes 56 are positioned adjacent the tanks while transverse pipes 57 lead into the tank adjacent the side walls thereof and are provided with perforations 58 on their sides lying adjacent to the sides of the tanks. By this arrangement, hot water may be fed into each of the tanks forcibly projected against the adjacent sides thereof and thus setting up a counter eddy in the tanks, it being noted that the transverse pipes 57 are arranged substantially at the level of the water within the tank. It is of course evident that any form of soap material may be added to the water in the washing tank while it is designed to provide clear water in the rinsing tank.

An outlet or drain pipe 59 is provided beneath the tanks having communication as at 60 with the bottom of each of the tanks and whereby the depth of the water in the latter may be regulated and the same may be drained when desired. The hot water inlet pipes are provided with regulating valves 61 while the separate drain pipes are provided with regulating valves 62.

A transverse outlet pipe 63 is positioned within the rinsing tank 11 in the same plane as the water inlet 57 thereof and substantially at the normal level of the water therein and the same constitutes a skimming device for the passing of the scum which is upon the surface of the water through the openings 64 of the drain pipe 63 where the same passes through the connecting pipe 65 to the main drain pipe 59.

From this detailed description of the entire device it will be seen that the tanks are provided with hot water to a certain regulated level therein and the temperature thereof is then governed by the heater burners 53. The basket being filled with dishes and mounted upon the drain board 15, the basket is transferred by means of the hoisting and carrying device to the washing tank and is deposited upon the spider platform 37 with the basket bottom journaled upon the shaft portion 38. The motor 39 is then operated whereby the clip fingers of the revolving platform 37 engage the basket bottom and thus revolve the basket within the tank. When the dishes are washed, the motor is stopped thus automatically disengaging the basket from the platform and then the hoisting device is utilized for raising the basket from the washing tank and depositing the same within the rinsing tank and is also serviceable in agitating the dishes within the rinsing water by forcibly elevating and lowering the container basket, and when sufficiently rinsed, the basket is removed by the hoisting device and deposited upon the draining board 13, where by reason of the extreme heat of the dishes the same become rapidly dried. The basket being thus removed from the platform 37, the platform and the entire frame 24 may be removed from the washing tank by releasing the engagement of the spring 29 with the frame arm 25.

It is evident that a revolving means may be also provided in the rinsing tank if desired after the same manner as that herein described and illustrated with respect to the washing tank.

While the forms of the invention herein shown and described are what are believed to be the preferred embodiments thereof, minor changes may be made in the form without departing from the spirit and scope of the invention as set forth in the claims.

What I claim as new is:—

1. In a dish washing machine, a tank, spaced lugs at one side of the tank, a bracket positioned upon the bottom of the tank and having one side thereof engaging the lugs, and a spring having one end secured within the tank remote from the lugs and its other end resiliently projecting above the bracket.

2. A dish washing machine comprising a tank, a bracket therein, a spider platform revolubly supported by the bracket, a dish basket mounted upon the platform, and automatically releasable means carried by the platform in engagement with the basket.

3. A dish washing machine comprising a tank, a bracket mounted therein, a revoluble shaft supported by the bracket and having a projecting upper end terminating in a conical portion, a spider platform upon the upper end of the shaft and adapted for rotation therewith, resilient clip fingers carried by the arms of the platform and projecting in similar directions, and a basket journaled upon the conical portion of the shaft and arranged for interengagement with the fingers during the normal rotation of the platform.

4. In a dish washing machine, a tank, a bracket comprising in part, two oppositely-disposed arms, rigid members carried by said tank for engaging one of said arms, resilient means engaging the other arm to hold the bracket in place, a dish basket supported on said bracket, driving means for the basket carried by said bracket, and means interposed between the basket and bracket for locking the basket to the said driving means.

In testimony whereof I affix my signature in presence of two witnesses.

MARION F. REDMON.

Witnesses:
EVELYN M. GRAU,
E. K. DIEHL.